US008590003B2

(12) United States Patent  
Bafna et al.

(10) Patent No.: US 8,590,003 B2
(45) Date of Patent: Nov. 19, 2013

(54) CONTROLLING ACCESS TO RESOURCES BY HOSTED ENTITIES

(75) Inventors: Sapna Mahendra Bafna, Redmond, WA (US); John David Bruner, South Barrington, IL (US); Xin Liu, Redmond, WA (US); Taqi Jaffri, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 820 days.

(21) Appl. No.: 12/484,520

(22) Filed: Jun. 15, 2009

(65) Prior Publication Data

US 2010/0319051 A1    Dec. 16, 2010

(51) Int. Cl.
  *G06F 17/00* (2006.01)
  *G06F 7/04* (2006.01)
  *H04L 29/06* (2006.01)

(52) U.S. Cl.
  CPC .................. *H04L 63/20* (2013.01)
  USPC ............ 726/1; 726/4; 726/5; 726/6; 726/21

(58) Field of Classification Search
  USPC .......................... 726/1, 4, 5, 6, 21
  See application file for complete search history.

(56) References Cited

U.S. PATENT DOCUMENTS

| | | | |
|---|---|---|---|
| 6,883,170 B1 * | 4/2005 | Garcia ............................. 718/1 |
| 7,069,330 B1 * | 6/2006 | McArdle et al. ............. 709/229 |
| 7,143,284 B2 | 11/2006 | Wheeler et al. | |
| 7,290,288 B2 | 10/2007 | Gregg et al. | |
| 7,376,745 B2 | 5/2008 | Shitano et al. | |
| 7,428,592 B2 | 9/2008 | Lee et al. | |
| 2004/0267645 A1 * | 12/2004 | Pollari ........................... 705/34 |
| 2005/0182964 A1 * | 8/2005 | Jooste ......................... 713/200 |
| 2007/0220588 A1 | 9/2007 | Panda et al. | |
| 2007/0271379 A1 | 11/2007 | Carlton et al. | |
| 2008/0098453 A1 * | 4/2008 | Hinton et al. ..................... 726/1 |
| 2008/0307529 A1 | 12/2008 | Choi et al. | |

FOREIGN PATENT DOCUMENTS

WO    0145341 A2    6/2001

OTHER PUBLICATIONS

Chatfield, et al., "Privacy and Security within Intelligent Environments", retrieved at <<http://www.cit.gu.edu.au/~craig/docs/Chatfield%202004%20-%20OzCHI%20-%20Privacy%20and%20Security%20in%20Intelligent%20Environments.pdf>>, 2004, pp. 4.

* cited by examiner

*Primary Examiner* — Peter Shaw

(57) ABSTRACT

Controlling resource access by entities hosted by an execution extension environment via entity identifiers associated with the resources or with the execution extension environment. Policy sets define the access to the resources. Each policy set includes a principal identifier for execution extension environment, a resource identifier for one of the resources, and access rights. The principal identifier or the resource identifier includes one of the entity identifiers. Access requests from entities are evaluated by comparing the entity identifiers to the policy sets. In some embodiments, the policy sets implement access control for web browsers hosting executable code that attempts to access resources on a computing device.

20 Claims, 4 Drawing Sheets

CONTROLLING ACCESS TO RESOURCES BY HOSTED ENTITIES

BACKGROUND

There are numerous technologies for the distribution of data over networks such as the Internet. Among these technologies are systems that permit data such as content to include executable code sent from a server to a computing device such as a cellular phone, laptop computer, or desktop computer, where the executable code is executed within some host application. For example, web browsers may host the executable code. The executable code allows content providers to execute programmed behavior to, for example, collect or manipulate data available from the computing device. Thus, the host application acts as an extension environment, where its operation is based the application itself and the functions performed by the hosted executable code. Although such existing systems often provide enhanced user experiences, these systems also raise security and privacy issues.

For example, allowing applications with executable code to access resources within a computing device exposes the computing device to possible attack. The executable code may include malicious code such as viruses or other programs or scripts (e.g., such as executed by a web browser) designed to steal information from the computing device. The vulnerable resources on the computing device include, for example, location information (e.g., global positioning system information), documents, images, address book information, call history, and the like.

Some existing systems include separate, layered access policy rules for controlling access by application programs to device resources. For example, if a user authorizes a browser to access particular resources on a mobile computing device and if the browser exposes that capability to web pages, then every web page (malicious or not) rendered by the browser has access to the particular resources. Additionally, operating systems within the existing systems may also provide a policy system to administer these access constraints. The existing systems, however, lack a policy system that provides the granularity to control access to the resources by entities (e.g., the web pages and the scripts they contain) hosted within an execution extension environment (e.g., the browser).

SUMMARY

Embodiments of the disclosure manage access by an entity associated with an execution extension environment to a resource on a computing device. A policy set defines the access to the resource. The policy set includes a principal identifier for the execution extension environment, a resource identifier for the resource, and access rights. The principal identifier or the resource identifier includes an entity identifier associated with the entity. In some embodiments, the policy set is maintained as a 3-tuple wherein the principal identifier or the resource identifier includes the entity identifier.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
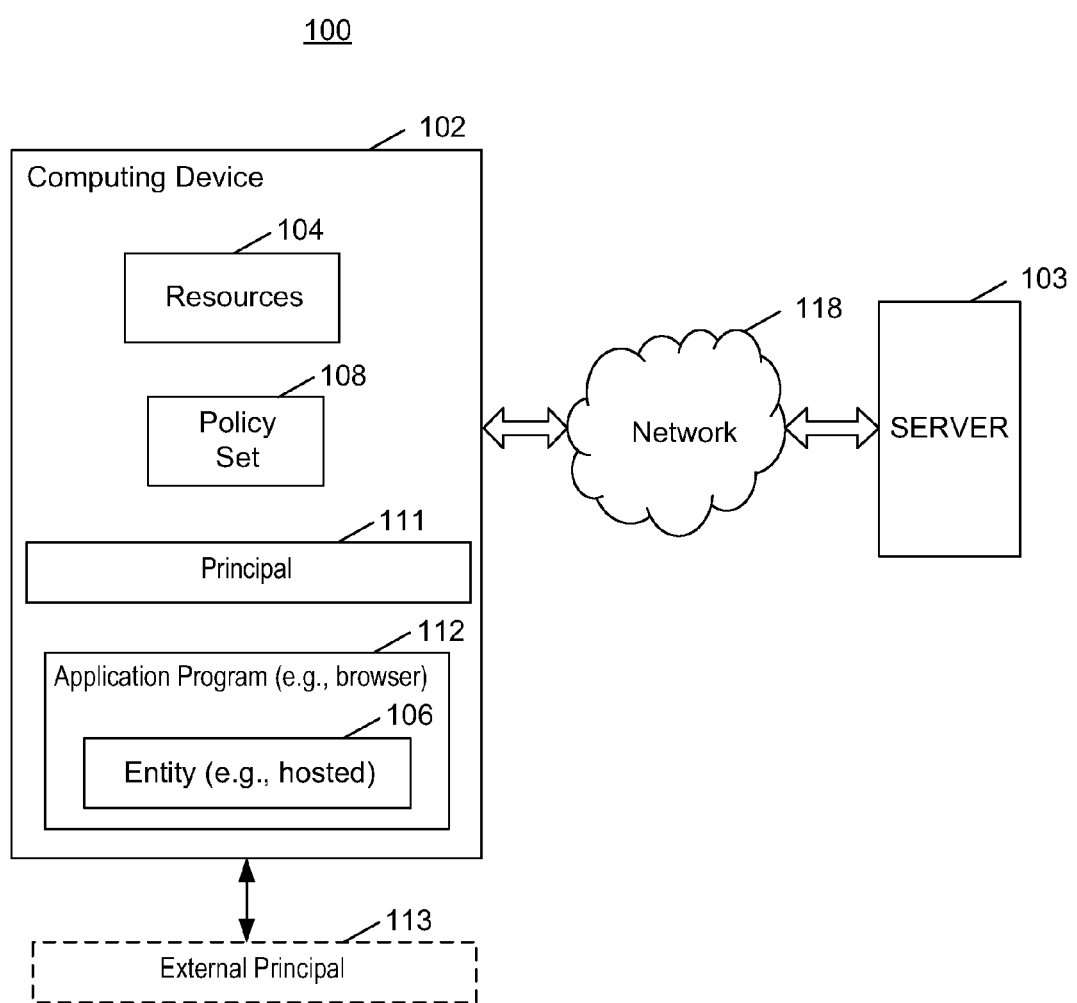
FIG. 1 is an exemplary block diagram illustrating an application program executing on a computing device and hosting an entity associated with a remote server.

Referring to the figures, embodiments of the disclosure enforce access rights 220 to a resource 104 by an entity 106 executing within an execution extension environment and associated with a principal 111. In some embodiments, the execution extension environment includes a host application program 112. The execution extension environment may also include, but not be limited to, a runtime framework and scripts (e.g., a Java© brand Virtual Machine, an Adobe© brand Flash© brand player, an ActiveX© brand control, or a Perl© brand interpreter), a service on a device or server that has customization capability, or other environment in which operation of the environment is defined by one or more of the entities 106. In other embodiments, the application program 112 includes a web browser hosting a package such as a ZIP© brand file.

In some embodiments, the application program 112 represents a parent application program executing on a computing device 102 and the entity 106 represents a child application program or other executable code. For example, the executable code is a web page hosted by a browser and the principal 111 comprises a user account under which the browser executes as well as an origin identifier of the entity 106. The web page attempts to access resources 104 associated with the computing device 102 such as location information, documents, and the like. The computing device 102 determines whether to grant or deny access to the resource 104 by the web page via one or more policy sets 108 as described below with reference to FIG. 2.

Embodiments of the disclosure extend the granularity of access policy set 3-tuples such as {Principal, Right, Resource} by including information about the entity 106 such as an identifier in either the principal element or the resource element of the access policy set 3-tuples. In this manner, aspects of the disclosure are compatible with existing policy engines, yet provide additional context about the principal 111 to enhance privacy protection. Further, the additional granularity is provided by aspects of the disclosure within a single policy system (e.g., the 3-tuple).

In some embodiments, the policy sets 108 of the disclosure enable policy engines to discriminate among web sites requesting access to location information associated with a mobile computing device. For example, a user of the mobile computing device executing a browser navigates to a map web site and later navigates to a work-related web site. The user wants the map web site to have access to the location information but the user does not want the work-related web site to be able to access the location information. Aspects of the invention enable the user to create two policy sets 108 for the same browser: one for the map web site and one for the work-related web site.

While some embodiments of the disclosure are illustrated and described herein with reference to the computing device 102 being the mobile computing device such as a mobile telephone, aspects of the disclosure are operable with any device that performs the functionality illustrated and described herein, or its equivalent. For example, embodiments of the disclosure are operable with netbooks, desktop computing devices, laptop computers, and other computing devices. In such embodiments, the policy sets 108 are stored by a cloud service and accessible by any device of the user.

Referring again to FIG. 1, the computing device 102 is connected to a server 103 or other computing device via a network 118. In some embodiments, the server 103 is a peer computing device and the computing device 102 and the peer computing device are in a peer-to-peer relationship. The computing device 102 has one or more of the resources 104 including, but not limited to, one or more of the following: location information (e.g., global positioning system coordinates), files, documents, images, camera output, accelerometer data, and any other data from the computing device 102. The computing device 102 stores one or more of the policy sets 108. One or more application programs 112 such as a web browser execute on the computing device 102. The application programs 112 provide an execution environment for other executable code such as hosted entities, one or more child application programs (e.g., nested or not), or any other executable code associated with the application programs 112. While the entity 106 is shown in FIG. 1 to be within or hosted by the application program 116, the entity 106 may be located off the computing device 102. For example, the principal 111 may be on the computing device 102 (e.g., as an account) or external to the computing device 102 (e.g., principal 113 as a uniform resource locator for the entity 106).

Figure 2:
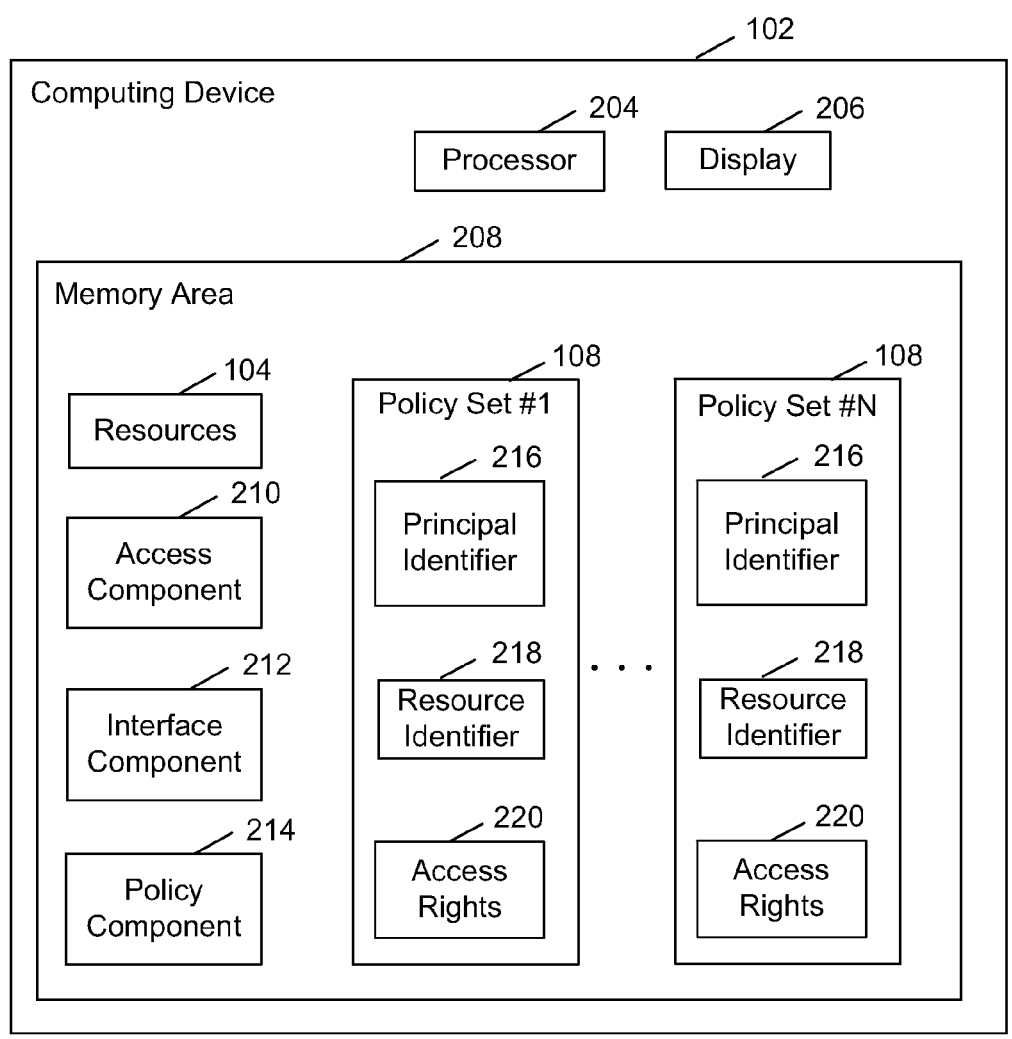
FIG. 2 is an exemplary block diagram of a computing device having a memory area storing components for controlling access rights to a resource by the entity associated with the application program.

Referring next to FIG. 2, an exemplary block diagram illustrates computing device 102 having a display 206, a memory area 208, and at least one processor 204. The display 206 may be, for example, a display device separate from the computing device 102, a display integrated into the computing device 102 (e.g., such as in a mobile telephone), a capacitive touch screen display, or a non-capacitive display. User input functionality may also be provided in the display 206, where the display 206 acts as a user input selection device such as in a touch screen.

The memory area 208, or other computer-readable medium or media, stores the resources 104 and a plurality of the policy sets 108 such as policy set #1 through policy set #N. Each of the policy sets 108 includes a principal identifier 216, a resource identifier 218, and the access rights 220. In embodiments in which the execution extension environment is an application program, the principal identifier 216 is a user account under which the application program 112 executes. The application program 112 hosts the entity 106 seeking access to the resource 104 identified by the resource identifier 218. In some embodiments, the application program identifier is a security identifier (SID) assigned to one of the application programs 112. The SID identifies the security context in which the application program executes. In this example, the SID is associated with a main thread of a process associated with the application program 112. In some embodiments, the SID is the principal identifier 216 for the account that is the principal 111, and the browser is the application program 112.

An entity identifier associated with the entity 106 is included in the principal identifier 216 or the resource identifier 218. The entity identifier is used to determine whether to provide access to one or more of the resources 104, as described below with reference to FIG. 3.

In some embodiments, each of the policy sets 108 is represented as 3-tuples in the form of {Resource, Principal, Access Rights}. The entity identifier is included in either the resource element or access rights element in the 3-tuple. The 3-tuple policy sets are evaluated against requests for the resources 104 to control access to the resources 104. In an example, the resource 104 is a location resource (e.g., providing location information describing the computing device 102). The principal 111 is the identity under which a web browser executes (e.g., as the application program 112) and the resource element is a string including an International Resource identifier (IRI) that identifies the location resource and identifies the entity 106 (e.g., web page) associated with the browser. An example format of such a 3-tuple that grants read access to the location resource is {LOCATION/website, browser, read}. This example 3-tuple policy set extends the granularity of resource access control to the web page or web site level. The tuple may also delegate, to the user, the decision about access rights. For example, the user is prompted to authorize or deny access to the specified resource 104 as part of a user brokered authorization framework.

The access rights 220 identify the type and depth of access by the principal 111 to the resource 104. For example, the principal 111 may have read only access, read/write access, or no access to the resource 104.

While the policy sets 108 shown in FIG. 2 are stored in the memory area 208 on the computing device 102, one or more of the policy sets 108 may be stored remotely from the computing device 102. For example, the policy sets 108 may be stored in a cloud service, a database or other memory area accessible by the computing device 102.

The memory area 208 further stores one or more computer-executable components. Exemplary components include, but are not limited to, an access component 210, an interface component 212, and a policy component 214. While the components are shown to be stored in the memory area 208, the components may be stored and executed from a memory area remote from the computing device 102. For example, the components may be stored by a cloud service, and the output of the execution of the components may be provided to the computing device 102. Such embodiments reduce the computational and storage burden on the computing device 102.

The interface component 212 receives user input to define the access rights 220. The access rights 220 define access by the entity 106 to the resource 104. The entity 106 executes within the application program 112 based on the principal 111. The principal 111 may be a combination of principals such as a principal of the application program 112 (e.g., an SID) and a principal of the entity 106 (e.g., an IRI). However, in some embodiments, the principal of the entity 106 may be a part of the resource identifier.

In some embodiments, the interface component 212 communicates with an application developer or another computing device to get data to define the access rights 220. The interface component 212 includes one or more user interfaces for receiving the user input from the user via a keyboard, touch display, mouse, or other user input selection devices. In some embodiments, the interface component 212 receives additional user input to define an expiration value for the access rights 220. The expiration value is stored in the policy set 108. For example, the user, application developer, or other party specifies that the access rights 220 are to be valid only for the current request, a current session, or for a defined period of time (e.g., a day, the next ten days, five minutes, or any other user-specified period of time).

The policy component 214 receives, identifies, or otherwise accesses one or more of the policy sets 108 representing policy rules. The policy component 214 also stores and maintains the policy sets 108. The access component 210 receives a request for the resource 104 from the entity 106, compares the received request to the policy set 108 received by the policy component 214, and grants the entity 106 access to the resource 104 based on the comparing. For example, the access component 210 compares the received request to each of the policy sets 108 available to the policy component 214. If a match is found (e.g., one of the policy sets 108 has the principal identifier 216 and the resource identifier 218 matching that from the received request), the access component 210 evaluates and applies the access rights 220 from the matched policy set. If, however, a matching policy set is not found, the access component 210 communicates with the interface component 212 to prompt the user to define the access rights 220 in some embodiments. For example, the prompt seeks to obtain authorization from the user to access the resource 104. The prompt may also provide a "don't ask me again" option to persist the access rights 220 received from the user. In such an instance, a new policy set is created based on the principal identifier 216, the resource identifier 218, and the explicitly received access rights 220 from the user. The new policy set is stored in the memory area 208 with the other policy sets 108.

The processor 204 executes computer-executable instructions for implementing aspects of the disclosure. For example, the processor 204 receives, from the user for example, the access rights 220 by the entity 106 to the resource 104, associates the entity identifier with the principal identifier 216 or the resource identifier 218, and associates the received access rights 220 with the principal identifier 216 and the resource identifier 218 to create a new policy set. The processor 204 operates to store the created policy set in the memory area 208.

In some embodiments, the processor 204 is transformed into a special purpose microprocessor by executing computer-executable instructions or by otherwise being programmed. For example, the processor 204 is programmed with instructions such as illustrated next in FIG. 3.

Figure 3:
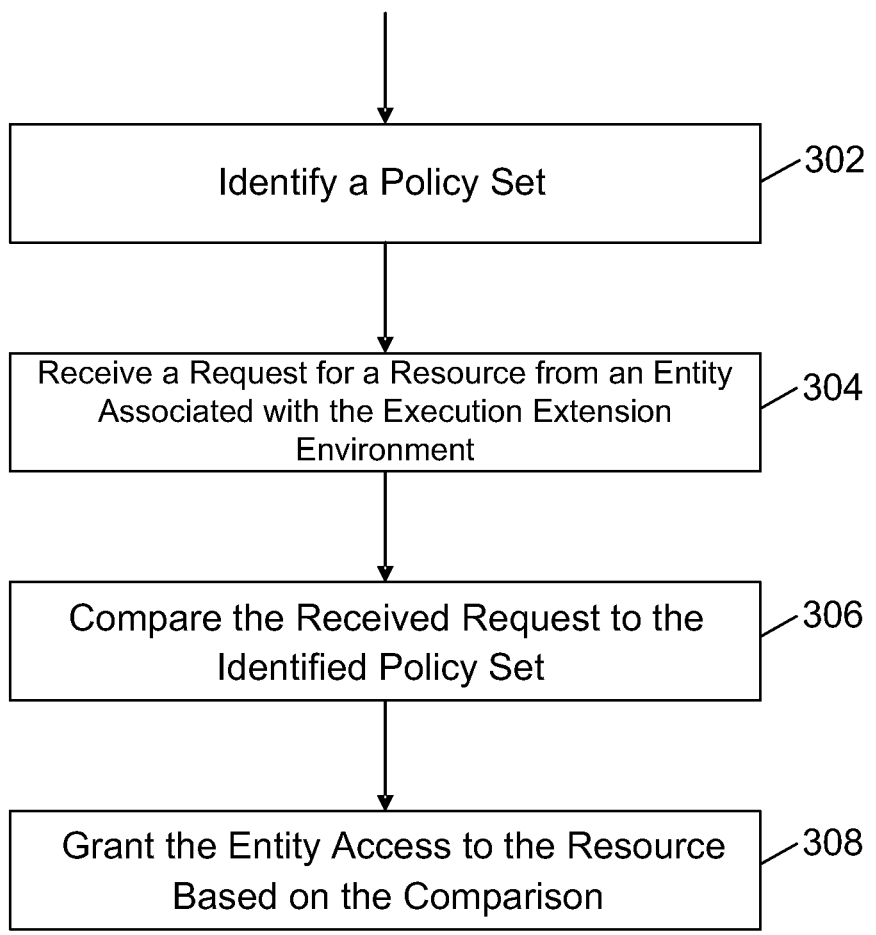
FIG. 3 is an exemplary flow chart illustrating a process for controlling access to a resource on a computing device.

Referring next to FIG. 3, an exemplary flow chart illustrates access control for the resource 104. At 302, one or more of the policy sets 108 are identified. The policy sets 108, which may be user-defined or a represent default policy sets provided by a third party, each include the principal identifier 216 for the execution extension environment, the resource identifier 218 for the resource 104, and the access rights 220. In one embodiment, the access rights 220 also include data defining what information the entity 106 is authorized to obtain from the resource 104 and which purposes for the data are authorized. For example, the user may specify, in one of the policy sets 108, that a particular web site may obtain location information about the computing device 102 for the purposes of providing directions for the user to a destination. In this example, a request by the entity 106 for the location information for the purpose of targeted marketing is denied.

An identifier associated with the principal of the entity 106 (e.g., an IRI) is appended to the identifier of the resource 104. For example, the principal identifier 216 is the SID of the account in which the application program 112 executes. The identifier for the resource 104 represents both the targeted resource and the principal of the entity 106.

At 304, a request for the resource 104 is received. The request is received from the entity 106 (e.g., a web page) or from the execution extension environment (e.g., a web browser) associated with the entity 106. In some embodiments, there is a policy rule (e.g., one of the policy sets 108) that specifies the user should be prompted for access to the unadorned resource identifier. If the user grants consent, a new policy set 108 is added. For this new policy set 108, the resource identifier is the concatenation of the resource 104 and the principal of the entity 106. In a subsequent check for access by the same application program 112 with the same entity 106 to the same resource 104, the new policy set 108 is matched first and access is granted or denied based upon the previous user response.

For example, at 306, the received request is compared to the identified policy sets to obtain a match. If one or more of the identified policy sets has the same principal identifier 216, entity identifier, and resource identifier 218 as in the received request, the access rights 220 of those policy sets are examined to determine whether to grant or deny access by the entity 106 to the resource 104.

At 308, the entity 106 is granted access to the resource 104 based on the comparison. For example, if the access rights 220 indicate that the entity 106 is allowed to access the resource 104, the request is granted. Alternatively, if the access rights 220 specify that the entity 106 should not be allowed access, the request is denied. In some embodiments, the absence of a matching policy set indicates that the request should be denied. For example, if a matching policy set is not identified, the entity 106 is denied access to the resource 104.

In embodiments in which the expiration value is specified in the policy set 108, the expiration value is examined at 306 or 308 to determine whether the access rights 220 are still valid. For example, if the access rights 220 have expired based on the expiration value in the policy set 108, the entity 106 is denied access. In some embodiments, the principal identifier 216 or the resource identifier 218 is modified to include the expiration value. In examples in which the resource identifier 218 takes the form of an IRI, a uniform resource locator (URL), or other syntax, the expiration value is represented in the resource identifier 218 by a query string or name-value pair.

Figure 4:
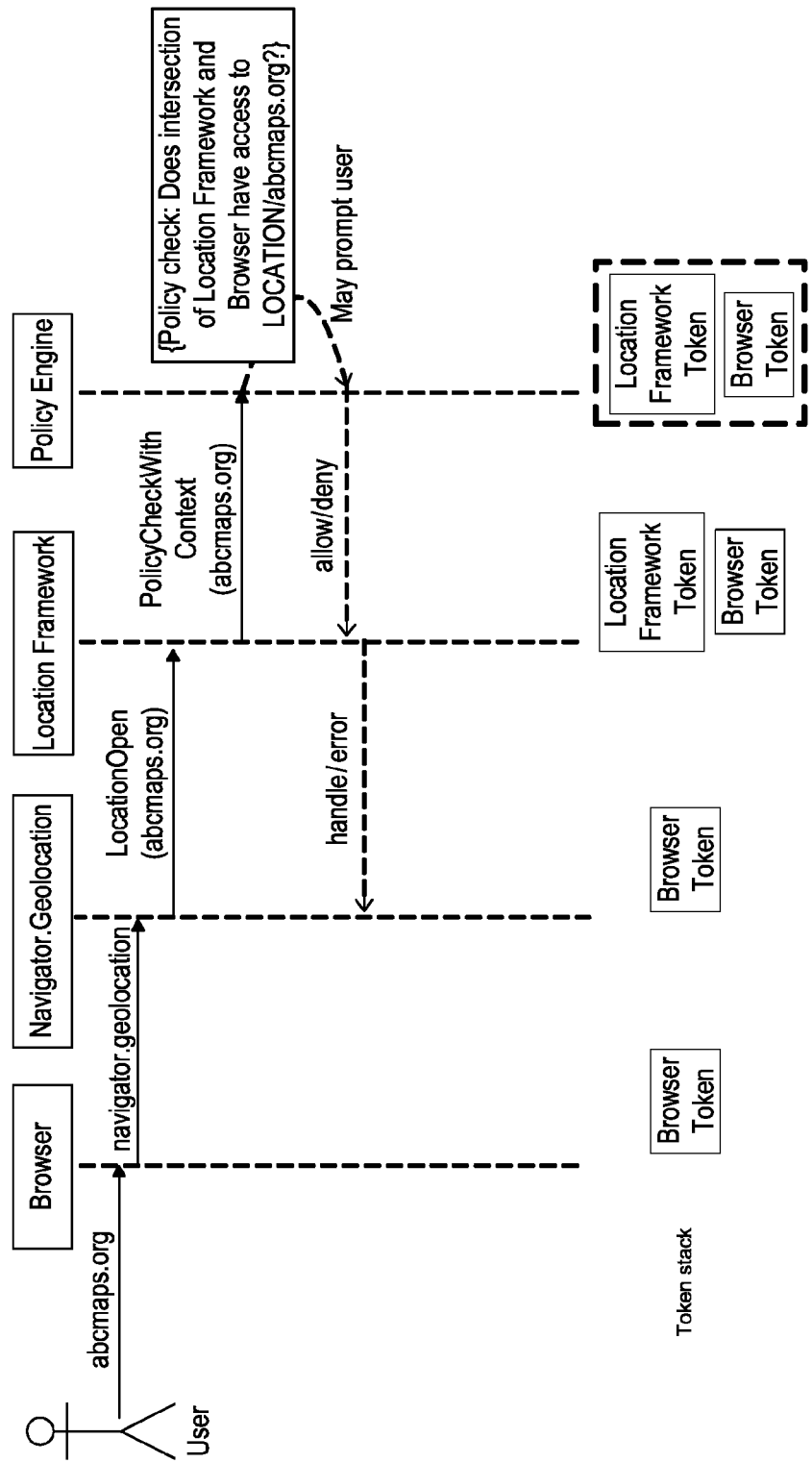
FIG. 4 is an exemplary flow diagram illustrating execution of a policy engine to control access by a browser-based map program to a location resource where an identity of the map program is associated with the location resource.

Referring next to FIG. 4, an exemplary flow diagram illustrates an alternative embodiment of the disclosure. In this example, execution of a policy engine to control access by a browser-based map program to a location resource where an identity of the map program is associated with the location resource. In this example, the user browses a map web site such as abcmaps.org with the mobile computing device. A token stack is maintained by the mobile computing device. The web site issues a request for location information for the mobile computing device (e.g., to compute driving directions) via navigator.geolocation function. The token stack includes a browser token at this stage. The browser token includes, for example, the application program identifier (e.g., SID) associated with the browser. The navigator.geolocation function contacts a location framework and identifies the web site context (e.g., a URL for abcmaps.org) along with the request for the location information. The location framework places a location framework token on the token stack. The location framework token identifies the location resource and includes the web site URL requesting access (e.g., a new IRI for the location resource is generated). For example, the location framework token includes the resource identifier 218 represented by LOCATION/abcmaps.org. In this example, the location framework executes on the mobile computing device.

The location framework performs a policy check by contacting a policy engine. The policy engine accesses the token stack and determines whether the web site within the browser has access to the location information. For example, the policy engine searches the policy sets 108 for an applicable policy set based on the location framework token and the browser token on the token stack. If an applicable policy set is found, the policy engine evaluates and applies the access rights 220 from the found policy set to allow or deny the web site access to the location resource. The location framework performs any error handling and reports the determination from the policy engine back to the user via the browser. In some embodiments, if none of the policy sets 108 is applicable, the policy engine prompts the user to manually allow or deny the request.

While the example of FIG. 4 is directed to the top-level domain of the example web site abcmaps.org, a hosted entity may be identified in the policy set 108 by any level of detail. For example, the policy set 108 may identify a top-level domain, a host, or particular web pages associated with the domain to allow or deny access by individual web pages. Further, the policy sets 108 may also include additional levels of granularity to apply to embodiments in which a web page hosts executable code that references additional executable code (e.g., nested child applications). For example, the browser hosts a web page that hosts another web page.

Further, while the example of FIG. 4 is directed to the location resource, the methodology described herein is applicable to any of the resources available on the mobile computing device.

Exemplary Operating Environment

A computer or computing device such as described herein has one or more processors or processing units, system memory, and some form of computer readable media. By way of example and not limitation, computer-readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

The computer may operate in a networked environment using logical connections to one or more remote computers, such as a remote computer. Although described in connection with an exemplary computing system environment, embodiments of the disclosure are operational with numerous other general purpose or special purpose computing system environments or configurations. The computing system environment is not intended to suggest any limitation as to the scope of use or functionality of any aspect of the disclosure. Moreover, the computing system environment should not be interpreted as having any dependency or requirement relating to any one or combination of components illustrated in the exemplary operating environment. Examples of well known computing systems, environments, and/or configurations that may be suitable for use with aspects of the disclosure include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein. Aspects of the disclosure may also be practiced in distributed computing environments where tasks are performed by remote processing devices that are linked through a communications network. In a distributed computing environment, program modules may be located in both local and remote computer storage media including memory storage devices.

The embodiments illustrated and described herein as well as embodiments not specifically described herein but within the scope of aspects of the disclosure constitute exemplary means for controlling access by the entity 106 to the resource 104, and exemplary means for managing the created policy set stored in the memory area 208.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for including context in an access policy on a mobile computing device, said system comprising:
a memory area for storing a policy set specifying an application program identifier of an application program executing on the mobile computing device, a resource identifier for a resource associated with the mobile computing device, and access rights, wherein the application program identifier or the resource identifier includes an entity identifier associated with an entity, the entity being executable code executing within the application program, wherein the access rights define access by the entity to the resource, the memory area further storing a token stack including a browser token and a location framework token, the browser token including the application program identifier and the location framework token including the resource identifier; and a processor programmed to:
receive the access rights by the entity to the resource;
associate the entity identifier with the application program identifier or the resource identifier by combining the entity identifier with one of the application program identifier or the resource identifier into a single identifier stored as the browser token or the location framework token;
associate the received access rights with the browser token and the location framework token to create the policy set; and
store the created policy set in the memory area.

2. The system of claim 1, wherein the application program comprises a browser, the entity comprises a web page and associated scripts, and the resource comprises location information associated with the mobile computing device.

3. The system of claim 1, wherein the processor is further programmed to associate an expiration value for the access rights, said expiration value being included with the application program identifier or the resource identifier.

4. The system of claim 1, wherein the access rights include data defining information to be collected by the entity and a purpose for the information to be collected.

5. The system of claim 1, further comprising means for controlling access by the entity to the resource.

6. The system of claim 1, further comprising means for managing the created policy set in the memory area.

7. The system of claim 1, further comprising a user interface configured to request user input to define the access rights.

8. The system of claim 1, further comprising a user interface configured to receive user input to define a plurality of the policy sets.

9. A method comprising:
identifying a policy set, said policy set defining access to a resource by an entity associated with at least one execution extension environment, said policy set including a principal identifier for the execution extension environment, a resource identifier for the resource, and access rights, wherein the principal identifier or the resource identifier includes an entity identifier associated with the entity by combining the entity identifier with one of the principal identifier or the resource identifier into a single identifier as a browser token or a location framework token, the browser token including the principal identifier and the location framework token including the resource identifier;
receiving a request for the resource from the entity;
comparing the received request to the identified policy set; and granting the entity access to the resource based on said comparing, the principal identifier corresponding to a host application program, and the entity being executable code executing within the host application program.

10. The method of claim 9, further comprising receiving user input to define the access rights.

11. The method of claim 9, wherein the principal identifier comprises a user account, the host application program executing under the user account.

12. The method of claim 9, wherein the identified policy set is user-defined.

13. The method of claim 9, further comprising:
associating an expiration value with the access rights; and
modifying the principal identifier or the resource identifier to include the expiration value.

14. The method of claim 9, wherein the execution extension environment comprises a browser, the entity comprises a web page, and the resource comprises location information associated with a mobile computing device.

15. The method of claim 9, further comprising accessing a 3-tuple representing the policy set, said 3-tuple including the principal identifier, the resource identifier, and the access rights, the resource identifier including the entity identifier.

16. The method of claim 15, wherein the resource identifier further identifies a principal associated with the entity.

17. One or more computer memories storing computer-executable components, said components comprising:
an interface component for receiving user input to define access rights by an entity to a resource, said entity being associated with at least one execution extension environment, said execution extension environment including an application program;
a policy component for receiving a policy set, said policy set defining access to the resource by the entity, said policy set including a principal identifier for the execution extension environment, a resource identifier for the resource, and the access rights defined by the interface component, wherein the principal identifier or the resource identifier includes an entity identifier associated with the entity by combining the entity identifier with one of the principal identifier or the resource identifier into a single identifier as a browser token or a location framework token, the browser token including the principal identifier and the location framework token including the resource identifier, the entity being executable code executing within the application program; and
an access component for receiving a request for the resource from the entity, comparing the received request to the policy set received by the policy component, and granting the entity access to the resource based on said comparing.

18. The computer memories of claim 17, wherein the interface component further comprises requesting user input to define an expiration value for the access rights, and wherein the policy component stores the expiration value in the policy set.

19. The computer memories of claim 17, wherein the execution extension environment comprises a browser, the entity comprises a web page, and the resource comprises location information associated with the mobile computing device.

20. The computer memories of claim 17, wherein the principal identifier comprises a user account, the application program executing under the user account.

* * * * *